United States Patent
Bressan et al.

[15] 3,635,657
[45] Jan. 18, 1972

[54] PROCESS FOR THE REMOVAL OF NITRIC OXIDE FROM INDUSTRIAL GASES

[72] Inventors: Giancarlo Bressan, Milan; Salvatore Gafa, Ferrara, both of Italy

[73] Assignee: Monlecatini Edison S.p.A., Milan, Italy

[22] Filed: Aug. 29, 1969

[21] Appl. No.: 854,319

[30] Foreign Application Priority Data

Aug. 31, 1968    Italy...................20709 A/68

[52] U.S. Cl. .................................................23/2 R, 23/159
[51] Int. Cl..........................................................B01d 53/34
[58] Field of Search.....................23/2, 2.1, 3, 3.1, 157, 159, 23/161, 181

[56] References Cited

UNITED STATES PATENTS 3,382,033    5/1968    Kitagawa.......................23/2

*Primary Examiner*—Earl C. Thomas
*Attorney*—Patricia Q. Peake and Stevens, Davis, Miller & Mosher

[57] ABSTRACT

Nitric oxide is removed from industrial gases, more particularly from gases formed in the cracking of hydrocarbons, by absorption in an aqueous solution containing at least one ferrous salt, at least one ammonia salt and free ammonia, under conditions such that the nitric oxide, which is usually present in the cracking gases in an amount of 50 to 200 p.p.m., is either totally removed or reduced to less than 0.5 to 1.0 p.p.m., in a single stage or step.

13 Claims, No Drawings

PROCESS FOR THE REMOVAL OF NITRIC OXIDE FROM INDUSTRIAL GASES

THE PRIOR ART

Various methods have been proposed for solving the problem of removing nitric oxide from industrial gases containing it, and for hindering the formation of nitrogeneous polymers ("nitroresins") in the coke oven gases due to reaction between the nitrogen oxides and diolefins. Such methods involve, just to mention the main ones: the oxidation of NO to $NO_2$, followed by an alkaline washing; the catalytic reduction of the NO to nitrogen or ammonia; the conversion of No into nitroresins by reaction with dienes; and absorption of the NO by suitable solid masses or solutions.

It has also been proposed to purify coke oven gases and public utility gas (city gas), both of which are notoriously much less rich in NO than the gases formed in the cracking of hydrocarbons, by means of solutions of $FeSO_4$ and $Na_2S_2O_3$; or by means of iron catalysts (contact mass), washed with a dilute alkaline solution, in particular an ammonia solution as for instance with the alkaline solution which serves to remove the $CO_2$ from the treated gaseous mixture. The behavior of the NO in the raw coke oven gas passing through a column filled with iron (corroded nails) covered by an aqueous ammonia solution has also been studied.

It appeared, from the state of the prior art, that while the alkaline solutions, particularly the ammonia solutions, of ferrous salts were more suited to the absorption of NO from the gases containing it than acid or neutral solutions, the alkaline solutions did not possess a satisfactory absorption capacity for a progressive removal of NO from gases containing it in initial quantities of the order of some tens of parts per million (p.p.m.).

More particularly, no processes were known which would solve, in a satisfactory manner, the problem of directly removing the NO contained in industrial gases, or of directly reducing the amount of NO contained in such gases from an initial content of 50 to 200 p.p.m. down to less than 1.0 to 0.5 p.p.m. This problem arises mainly in plants producing acetylene from hydrocarbons, where the gases often contain appreciable percentages of NO as a result of the conditions of temperature and pressure under which the cracking is carried out.

The conventional purification processes for the gases from cracking, such as, for example, the alkaline washing processes, or washing with $FeSO_4$ plus $Na_2S_2O_3$, reduce the NO content from 50 to 200 p.p.m. to about 5 to 10 p.p.m. The processes which reduce the NO contents in coke oven gases from an initial content of 5 to 10 p.p.m. to less than 1 to 0.5 p.p.m. are not directly applicable to cracking gases, since those processes involve oxidation with ozone or with $ClO_2$ and subsequent alkaline washing, or the use of catalysts.

The removal of NO from the cracking gases containing it, initially, in amounts of 50 to 200 p.p.m., or a reduction of the NO content of the cracking gases to less than 1 to 0.5 p.p.m., by the conventional processes, would require, at best, a two-step operation. That is to say, the removal or reduction would require a first purification (first stage) in which the NO content of the cracking gases is reduced from 50 to 200 p.p.m. to 5 to 10 p.p.m., and a second purification (second stage) in which the NO content of the cracking gases is further reduced from 5 to 10 p.p.m. to less than 1 to 0.5 p.p.m. In general, the means suitable for removal of the NO from the cracking gases in the two stages would be different, since the second stage would involve, for instance, an oxidation reaction, using ozone, $ClO_2$, or $PbO_2$, and a subsequent alkaline washing, and those operations would be altogether unsuitable for precipitating NO from gases containing it in an amount of 50 to 200 p.p.m. to effect a reduction of the NO content to 5 to 10 p.p.m. in the first stage of the two-stage process postulated.

Such a two-stage process would require a complicated apparatus setup comprising several columns. In addition, it would be dangerous to treat, with ozone or $ClO_2$, gas mixtures, such as the gases from cracking, which contain highly reactive compounds like acetylene and its homologs, which compounds do not occur in coke oven gases.

It has been suggested to totally eliminate the nitric oxide from cracking gases containing 0.001 to 0.2 percent of NO, in a single step, by compressing the gas in the presence of at least 0.5 percent by volume of oxygen, at 0° to 50° C., and up to 2–50 absolute pressure, and simultaneously or immediately thereafter absorbing the oxidation products, $N_2O_3$ and $NO_2$ in either water or in aqueous alkaline washing liquids. In this way, a total precipitation of the NO would be achieved satisfactorily, but there is the major disadvantage that the concurrent presence of NO, $O_2$, and dienic hydrocarbons in the gas leads to the formation of nitroresins. The nitroresins are dangerous in the dry state and, in addition, can lead to clogging of the piping in that part of the plant which is located between the oxygen feed-in point and the alkaline washing.

It is necessary, in said process, to compress the gas after the introduction of the oxygen, since otherwise the washing of the gas at 1.0 atm. would require an excessively large column. Gas compressors of the liquid ring type may be used to partially inhibit the formation of nitroresins, due to the presence of water, or, in any event, to remove nitroresins formed with the liquid. However, even if nitroresins are not deposited in the compressors, the process still has a number of serious drawbacks.

In the first place, for total precipitation of the NO, it is necessary to introduce into the cracking gas, prior to the compression, as least 1.2 percent of oxygen, and a quantity of oxygen exceeding 1 percent involves substantial hazard in a gas containing acetylene and its homologs. In the second place, the occurrence of a deposit of nitroresins in the piping between the compressors and the washing column is unavoidable, so that apart from the hazard represented by the nitroresins, there is the additional problem of clogging of the piping.

THE PRESENT INVENTION

The object of this invention is to provide an improved method of absorbing NO from industrial gases, more particularly from gases coming from hydrocarbon cracking, by means of solutions containing ferrous salts, and which permits of reducing the amount of NO in the cracking gas from an initial content of 50 to 200 p.p.m. to less than 1 to 0.5 p.p.m., in a single stage or step.

By the process of this invention it is possible to achieve a practically total removal of the NO in a single step without introducing oxidants into the cracking gas and without problems arising from the formation of nitroresins, while avoiding the need for expensive liquid ring compressors and requiring only a single column.

Surprisingly, we found that very effective solutions for the absorption of NO from cracking gases particularly are obtained by adding ammonia salts, in a suitable concentration, to ammonia-containing ferrous salt solutions. The absorption, at least at the start, takes place through the formation of coordination compounds of bivalent iron of the type: $[Fe(NO)(NH_3)_5]$. These complexes are subject to subsequent oxyreductions with the formation of ferric salts and reduction products of $NO(N_2, N_2O, H_2N_2O_2)$.

Using treating solutions according to this invention, which consist of aqueous solutions of ammonia, or more ferrous compounds and one or more ammonia salts, it is found that by operating at 10° to 50° C., with a suitable choice of ferrous and ammonia compounds, and under suitable conditions of concentration, preferably in counterflow, it is possible to ensure absorptions of NO such that the content thereof in the cracking gas treated is reduced from 50 to 200 p.p.m. to less than 1.0 to 0.5 p.p.m. in contact times of from 10 to 50 seconds, calculated as the ratio between the free volume of the column and the flow rate of the gas. Washing of the gas with the solutions can be carried out under pressure.

The preferred ferrous salts for use in practicing the invention are ferrous sulfate and ferrous chloride. The preferred ammonia salts are the chloride, carbonate, carbamate, and bicarbonate, of which the last three are in equilibrium with each other in aqueous solutions of $CO_2$ and $NH_3$. Less effective but nevertheless useful ferrous compounds are the hydroxide, nitrate, carbonate, sulfite, formate, acetate and oxalate. Less effective ammonia compounds are ammonium nitrate, sulfate, and sulfite.

The most suitable concentrations of the ferrous compound in the washing solution are comprised between 2 and 50 millimols per liter. Preferably, the concentration of the ferrous compound is between 10 and 30 mM/l.

The most suitable concentrations of the ammonia salts are comprised between 0.1 and 4.0 M/l. Preferably, the concentration of the ammonia salt is between 0.4 and 2.0 M/l.

The solution may contain from 0.1 to 5 M/l. of free ammonia, preferably from 0.5 to 2.0 M/l.

Below the limits stated, some removal of the NO is obtained, but the optimal indicated values are not attained. On the other hand, for reasons of economy, it is preferable not to exceed the upper limits stated for the concentrations.

Mixtures of the ferrous compounds mentioned, and/or of the ammonia compounds may be used.

As an illustration, for washing 100 Nl. (normal liters) of gas there may be used, in general, from 1 to 20 liters of the solution.

It is particular economic advantage to use, in practice, and as the ferrous compound, the heptahydrate of ferrous sulphate which is obtained in great quantities as a byproduct of the production of $TiO_2$ from ilmenite via titanium sulphate, and in the pickling of metal sheets.

During the absorption, the concentration of ferrous ions available for fixation of NO decreases gradually (in a molar ratio of 1:1 on the NO absorbed), due to the formation of nitrous complexes.

The consumption of iron in general may be greater than 1 g. atom per mol of NO, because there may occur a formation of ferric salt and the precipitation of hydrated magnetites, in the formation of which both the ferric and ferrous salts are involved.

Furthermore, it has been observed that the removal of the NO gradually becomes less effective when the concentration of ferrous ions in the solution drops below about 2.0 mM/l.

In order to maintain in solution the quantity of ferrous ions needed for optimum removal of the NO, that is for reduction of the NO content to 0.05 to 1.0 p.p.m., in sufficiently short contact times, it may be convenient to carry out the removal of the NO in a washing column filled, partially or completely, with iron material which, being attacked by the ammonia in the washing solution, ensures a continuous immission of ferrous ions into the solution. Such process for the precipitation of NO from gaseous mixtures, utilizing ammonia solutions of ferrous compound and ammonia salts in the presence of metal iron, is one embodiment of this invention. In said embodiment, in which there is the continuous immission of ferrous ions into the cycle, the regeneration of the solution may be carried out either by filtering or decanting the ferric salts which are formed, or by continuously or intermittently draining off a part of the solution, from which the ammonia can be easily recovered by known methods.

In carrying out the last-discussed embodiment of the invention, the concentrations of ferrous ions or ammonia salts must be in the ranges indicated hereinabove. Tests carried out at concentrations comparable with those used in prior art operations utilizing contact masses of iron have resulted in practically no removal of NO when the content thereof in the gas to be purified is in the order of a few tens of p.p.m. (see example 9, below).

The importance of the presence of a certain minimum concentration of ferrous ions to the effective removal of NO has not been recognized previously. In fact, the literature concerned with those known processes involving the use of contact masses of iron (in the purification of coke oven gases), and in which there were present iron and solutions which could give rise to the presence of ferrous ions, attributes the purifying action, with respect to NO, to a catalytic effect.

Even when the quantities of ferrous ions and of ammonia salts are increased beyond the catalytic quantities applied to the coke oven gases, it is impossible to purify the gases from cracking processes unless the concentrations are increased to the ranges disclosed herein, which are critical for the attainment of the present primary objective of removing NO from cracking gases or reducing the NO content of those gases from 50 to 200 p.p.m. to less than 1.0 or 0.5 p.p.m., in a single step.

The ferrous complexes are sensitive to the oxidants and quickly form ferric hydrates and oxides. Oxygen itself, even diluted, could deactivate the solutions. Therefore, it is preferred that the gas to be purified not contain oxygen in an amount exceeding 0.1 percent.

The present method for the precipitation of NO is definitely applicable to the gases from cracking, because the ferrous complexes are chemically inert to carbon oxide and to the other reactive components of cracking gases, including acetylene derivatives. It is usually advisable to carry out the absorption of the NO after removal of the $CO_2$, in order to avoid carbonation of the ammonia solution.

As already mentioned, gases from cracking which are intended for the production of acetylene often have a higher content of NO than coke oven gases, for instance of the order of tens of parts per million as, for example, in the Fauser-Montecatini process for light benzines. In the cracking processes, the raw gas is generally subjected to successive stages of cooling, compression and washing for the separation of the various hydrocarbons, but the NO is for the most part collected in the tail gases consisting mainly of: CO, $H_2$, $C_2H_4$ and $CH_4$. Generally, this mixture is subjected to fractionation in plants operating at low pressure, such as the Linde-type plant, for the production of synthesis gases and ethylene. The average tolerated content of nitric oxide for gases to be subjected to fractionation is lower than 0.5 p.p.m. if the formation of nitroresins, which are explosive at low temperature, is to be avoided. The method this invention is well adapted to reduction of the NO content to that very low limit.

In the Fauser-Montecatini process, the removal of the NO may be carried out downstream of the stage at which the gases are decarbonated. A similar arrangement can be employed in the SBA and Hoechst processes. The SBA (Societe Belge de l'Azote) and Hoechst (Farbwerke Hoechst) processes are combustion processes, as is, also, the Fauser-Montecatini process, and are described in Kirk-Othmer, Encyclopedia of Chemical Technology, I (1963), pp. 186–193.

The following examples are given to illustrate the present invention, and are not intended to be limiting. As used in the examples and elsewhere herein, including the claims, the expressions mM/l.; M/l.; and l./hr. have, respectively, the following meaning: millimol per liter; mol or mols per liter; liter per hour.

EXAMPLE 1

Sixty liters per hour of nitrogen containing 30 p.p.m. of NO were fed into a glass column (inside diameter, 2.6 cm.; h, 110 cm.), filled with Raschig glass rings (7×7 mm.). The gas was washed in countercurrent with 1 liter of an aqueous solution containing 15 mM/l. of $FeSO_4 \cdot 7H_2O$, 1 M/l. of $(NH_4)_2CO_3$ and 1.8 M/l. of $NH_3$. This solution was recycled at a flow rate of 10 l./hr. The washing was performed at room temperature and pressure with a contact time of 30 seconds for a total of 15 hours. The outflowing gas contained 0.2–0.3 p.p.m. of NO.

By operating under the same conditions but in the absence of ammonia salts, the removal of NO proved to be much inferior.

In the same column, 60 l./hr. of nitrogen containing 50 p.p.m. of NO were treated with 10 l./hr. of an aqueous solution containing 15 mM/l. of $FeSO_4 \cdot 7H_2O$ and 6 M/l. of $NH_3$ (volume of solution: 1.1). The treatment was carried out at room temperature and pressure, with a contact time of 30 seconds. The content in NO of the outflowing gas after 1 hour of cycling was 10 p.p.m.; after 7 hours the content in NO of the outflowing gas was 50 p.p.m., that is, no removal of NO occurred.

EXAMPLE 2

In this case, the washing was performed under the same conditions as those of the preceding example, but with 40 l./hr. of gas, which was washed with 8 l./hr. of an aqueous solution of $FeCl_2 \cdot 4H_2O$ (15 mM/l.), $(NH_4)_2CO_3$ (1 M/l.), and $NH_3$ (1.8 M/l.) for a period of 6 hours. The outflowing gas contained 0.1–0.2 p.p.m. of NO.

EXAMPLE 3

Using the same equipment as that used in example 1, 40 l./hr. of nitrogen containing 30 p.p.m. of NO were treated for 7 hours at room temperature with 8 l./hr. of an aqueous solution (volume: 1 l.) containing 25 mM/l. of $FeCl_2 \cdot 4H_2O$, 2 M/l. of $NH_4Cl$, and 1.8 M/l. of $NH_3$. The outflowing gas contained from 0.2 to 0.8 p.p.m. of NO.

EXAMPLE 4

Example 1 was repeated except that the washing was carried out at 50° C., instead of at room temperature. The NO at the outlet, during 8 hours of test, was approximately 0.8 p.p.m.

EXAMPLE 5

Into a metal column having an inside diameter of 2.6 cm. and a height of 110 cm., filled with Raschig glass rings (7×7 mm.), there were introduced 420 Nl./hr. of nitrogen containing 30 p.p.m. of NO, at a pressure of 7 atm.

The gas was washed in countercurrent with 20 l./hr. of an aqueous solution containing 20 mM/l. of $FeSO_4 \cdot 7H_2O$, 1 M/l. of $(NH_4)_2CO_3$ and 1.8 M/l. of $NH_3$ (volume of solution: 1 l.). The washing was carried out under a pressure of 7 atm. and at room temperature, with a contact time of 30 seconds for a total of 20 hours. The outflowing gas contained from 0.2 to 0.4 p.p.m. of NO.

EXAMPLE 6

Into a column as used in example 1, filled for one-third with iron chips and for two-thirds with glass rings, there were introduced 60 l./hr. of nitrogen containing 80 p.p.m. of NO, in countercurrent to 10 l./hr. of an aqueous solution containing 1 M/l. of $(NH_4)_2CO_3$, 2 M/l. of $NH_3$ and 10 mM/l. of $FeSO_4 \cdot 7H_2O$ (volume of solution: 1 l.). The washing was performed at room temperature and under atmospheric pressure, with a contact time of 30 seconds for a period of 44 hours. The outflowing gas contained 0.2–0.4 p.p.m. of NO.

EXAMPLE 7

From a pilot plant for high-temperature cracking for light benzines, with a partial combustion process there was obtained a gas of the following composition:

| | |
|---|---|
| Ethylene | 12% vol. |
| Acetylene | 10% vol. |
| CO | 17% vol. |
| $H_2$ | 37% vol. |
| Methane | 14% vol. |
| Other hydrocarbons | 3% vol. |
| NO | 40 p.p.m. |
| $CO_2$ | <100 p.p.m. |

Into a column as used in example 1, filled with glass rings, there were fed 40 l./hr. of this gas which was then washed in countercurrent with 8 l./hr. of an aqueous solution containing 30 mM./l. of $FeSO_4 \cdot 7H_2O$, 1 M/l. of $(NH_4)_2CO_3$, and 1.8 M/l. of $NH_3$ (volume of solution: 1 l.). The washing was carried out under atmospheric pressure and room temperature with a contact time of 50 seconds for a total of 20 hours. The outflowing gas contained from 0.5 to 1 p.p.m. of NO.

EXAMPLE 8

One hundred twenty l./hr. of gas having the same composition as that of example 7, were sent into the glass column of example 1, filled for one-third with iron chips, and for two-thirds with glass rings. Fifteen l./hr. of an aqueous solution containing 1 M/l. of $(NH_4)_2CO_3$, 2 M/l. of $NH_3$ and 10 mM./l. of $FeSO_4 \cdot 7H_2O$ (volume of solution: 1 l.) were circulated in countercurrent in the column. The washing was performed under atmospheric pressure and at room temperature; with contact times of 15 seconds for a total of 240 hours. The outflowing gas contained 0.5 to 1 p.p.m. of NO.

The total volume of circulating solution was 1 liter with a purge of 100 cc. per day, which were restored by the addition of fresh solution.

EXAMPLE 9

Into the same column as used in example 1, filled for one-third with iron chips and for two-thirds with glass rings, there were fed 60 l./hr. of nitrogen containing 60 p.p.m. of NO. The gas was washed in countercurrent with 1 liter of an aqueous solution containing 40 mM of $(NH_4)_2CO_3$. This solution was recycled at a rate of 10 l./hr. The washing was carried out under atmospheric pressure and at room temperature for a total of 20 hours. During the tests, the concentration in iron ions varied from 0.5 to 1 mM/l. The outflowing gas contained from 40–50 p.p.m. of NO. Thus, the precipitation of NO was negligible. This example proves that using concentrations of ammonia salts and ferrous salts lower than those used in accordance with the present invention it is not possible to achieve an effective purification of the gases from cracking because of the particular NO contents thereof.

As will be apparent, changes in details may be made in practicing this invention, without departing from its spirit. Therefore, it is intended to include, in the scope of the appended claims, all such modifications and variants as will be obvious to those skilled in the art from the description and working examples given herein.

We claim:

1. A process for reducing the NO content of industrial gases, and in particular gases from hydrocarbon cracking, to less than 1.0 part per million, in a single step, which comprises washing the gas with an aqueous solution of from 2 to 50 mM/l. of a ferrous salt, from 0.1 to 4 M/l. of an inorganic ammonium salt, and from 0.1 to 5.0 M/l. of ammonia.

2. The process according to claim 1, characterized in that the gas is washed at a temperature of the washing solution of from 10° to 50° C., and with a contact time of from 10 to 50 seconds.

3. The process according to claim 1, characterized in that the gas from which the NO is to be absorbed is washed countercurrently with the aqueous solution.

4. The process according to claim 1, characterized in that the ferrous salt is selected from the group consisting of the hydroxide, chloride, nitrate, carbonate, sulfate, sulfite, formate, acetate and oxalate.

5. The process according to claim 3, further characterized in that the ferrous salt is ferrous chloride.

6. The process according to claim 3, further characterized in that the ferrous salt is ferrous sulfate.

7. The process according to claim 1, characterized in that the ammonium salt is selected from the group consisting of the sulfate, sulfite, chloride, nitrate, carbonate, carbamate and bicarbonate.

8. The process according to claim 7, further characterized in that the ammonium salt is ammonium chloride.

9. The process according to claim 7, further characterized in that the ammonium salt is ammonium carbonate.

10. The process according to claim 7, further characterized in that the ammonium salt is ammonium carbamate.

11. The process according to claim 7, further characterized in that the ammonium salt is ammonium bicarbonate.

12. The process according to claim 1, further characterized in that the aqueous washing solution contains from 0.4 to 2.0 M/l. of ammonia.

13. The process according to claim 1, characterized in that washing of the gas with the aqueous washing solution is carried out in the presence of metallic iron.

* * * * *

UNITED STATES PATENT OFFICE
CERTIFICATE OF CORRECTION

Patent No. 3,635,657    Dated January 18, 1972

Inventor(s) Giancarlo Bressan, et. al.

It is certified that error appears in the above-identified patent and that said Letters Patent are hereby corrected as shown below:

On the cover sheet [73], "Monlecatini" should read -- Montecatini -- . Column 2, line 65, between "ammonia," and "or", insert -- one -- .

Signed and sealed this 15th day of May 1973.

(SEAL)
Attest:

EDWARD M. FLETCHER, JR.                ROBERT GOTTSCHALK
Attesting Officer                       Commissioner of Patents